United States Patent [19]

Ishige et al.

[11] 4,224,376
[45] Sep. 23, 1980

[54] PROCESS OF MANUFACTURING A HEAT-RESISTANT COMPOSITE SHEET

[75] Inventors: Yoshiki Ishige, Tokorozawa; Toshiyuki Kinugasa, Hidaka; Yoshio Ando, Kawagoe; Shoji Sato, Tokorozawa, all of Japan

[73] Assignee: Honda Giken Kogyo Kabushiki Kaisha, Tokyo, Japan

[21] Appl. No.: 54,628

[22] Filed: Jul. 3, 1979

[30] Foreign Application Priority Data

Jul. 7, 1978 [JP] Japan .................. 53/81963

[51] Int. Cl.² .................. B32B 3/26; B32B 5/18
[52] U.S. Cl. .................. 428/315; 156/331; 156/332
[58] Field of Search .......... 428/310, 315; 156/331, 156/332

[56] References Cited

U.S. PATENT DOCUMENTS

| | | | |
|---|---|---|---|
| 3,620,898 | 11/1971 | Harris et al. | 428/315 |
| 4,137,366 | 1/1979 | Harada et al. | 156/331 |
| 4,143,091 | 3/1979 | Chang et al. | 428/315 |

FOREIGN PATENT DOCUMENTS 2701431  7/1977  Fed. Rep. of Germany ........ 428/315

*Primary Examiner*—William J. Van Balen
*Attorney, Agent, or Firm*—Haseltine, Lake & Waters

[57] ABSTRACT

A process for manufacturing a heat-resistant composite sheet comprising applying a bonding agent with an added cross-linking agent on one of the facing surfaces to be adhered of a thermoplastic resin sheet and a polyolefin foam sheet. The two sheets are then placed one upon another through the bonding agent coated layer and are bonded together while heating the same and applying pressure thereto.

6 Claims, 1 Drawing Figure

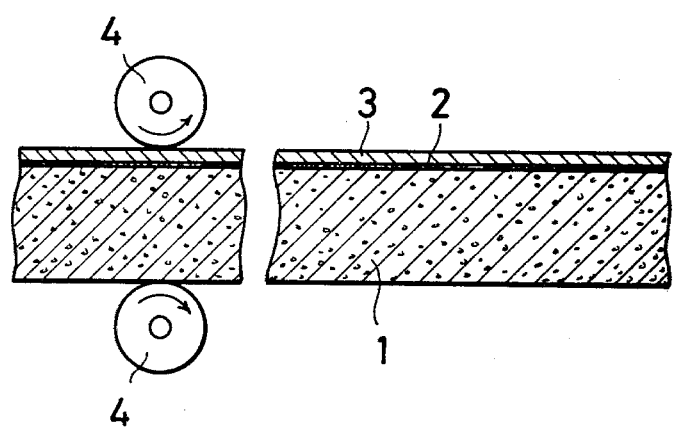

PROCESS OF MANUFACTURING A HEAT-RESISTANT COMPOSITE SHEET

FIELD OF THE INVENTION

This invention relates to a process for manufacturing a heat-resistant composite sheet comprising a foam sheet and a laminating sheet which is used as an interior material such as an instrument panel or the like for a motorcar or additionally as material for furniture, building or the like.

PRIOR ART

In a previously known such process for manufacturing a composite sheet of this kind used for an instrument panel, a leather sheet is set in one mold, and a hard base member is set in the other mold, and the interior mold space formed by closing the two molds is then charged with a foaming liquid for polyurethane foam and is foamed. This conventional type of manufacturing process, however, has the disadvantages that a harmful reaction gas is generated which is detrimental to the environment, and additionally the leather sheet previously given a predetermined shape by a vacuum shaping treatment is deformed, collapsed or shrunk in stock and consequently does not fit well in the mold.

Accordingly, there has been developed a method of manufacturing a composite or laminated sheet wherein a semi-hard leather sheet and a heat-resistant foam sheet of the polyolefin type are bonded together. In this case, such durable materials that are not deformed even by a change in temperature from ambient temperature to about 100° to 110° C., such as, for instance, a combination of a polyolefin foam sheet, especially, a polypropylene foam sheet and a polyvinyl chloride sheet is preferable. However, a satisfactory bonding therebetween has not been obtained by simply bonding the two together with various kinds of bonding agents interposed therebetween.

Accordingly, an increase in bonding force has been tried either by treating both the surfaces of the foam sheet and the polyvinyl chloride sheet with an oxidizing agent such as a chromic acid mixture or the like or by subjecting both surfaces to a physical treatment such as sanding or the like. However, good results have not been obtained. Further, there has been developed a process wherein polyolefin resin powders are spread over the polyvinyl chloride and molten by heat sheet in order to bond them or wherein a bonding agent is impregnated in the sheet in order to bond them, but here again it has not been possible to obtain durable and delamination-resistant products which are resistant to a temperature change to about 100° C.

SUMMARY OF THE INVENTION

The present invention has been made in the light of the above facts, and it is characterized in that at least one of the facing surfaces of a thermoplastic resin sheet and a polyolefin foam sheet to be bonded together is coated with a bonding agent prepared by adding a cross-linking agent to a hot-melting type bonding agent of the polyester type or polyurethane type, and the two sheets are placed one upon another at the bonding agent coated surface and subjected to pressure and heat, so that a cross-linking hardening treatment occurs in the bonding agent between the sheets.

Namely, this invention is such that the hot-melting type bonding agent is activated by heat, and becomes molten and consequently exhibits a good bonding characteristic because of its fluidity, and thereafter the molten resin is hardened by being subjected to cross-linking with the cross-linking agent, and as a result there is brought about a mutually integral and firm bonding between the surfaces of the foam sheet and the laminating sheet.

BRIEF DESCRIPTION OF THE DRAWING

The FIGURE is a sectional view, partly omitted, showing one example of this invention.

DETAILED DESCRIPTION

A polypropylene foam sheet 1 of about 4 mm thickness, and a polyvinyl chloride type leather sheet 3 of about 0.5 mm thickness are taken as the materials to be laminated one upon another, and the surface to be adhered of the foam sheet 1 is coated with a bonding agent consisting of a hot-melting type adhesive agent of the polyester type or polyurethane type or the like containing a cross-linking agent, such as an isocyanate type, whereby a thin coating layer 2 thereof is formed on the surface. After the coating layer 2 is dried, the foam sheet 1 is heated to temperature in the range of from 190 to 220° C. The polyvinyl chloride sheet 3 previously heated to above 160° C. is put on this heated foam sheet surface, and these are passed through a pair of upper and lower pressing rolls 4, 4 as illustrated and thereby the two are pressed against each other and are bonded. During this time, the bonding agent completes its cross-linking action, and thus there can be obtained a composite sheet wherein the two sheets are bonded together by the cross-linkage connection.

When this composite sheet was subjected to a bonding strength test, the polypropylene foam sheet resisted to the tensile force and the foam sheet itself was broken. Further, when this composite sheet, after repeated heating several times at about 105° C. for eight hours, was subjected to the test in almost the same manner as above, the rupturing of the polypropylene foam sheet itself again occured. Thus, it was demonstrated that the heat-resistance and bonding force of the bonding layer 2 between the boundary surfaces of the two sheets were extremely high and excellent.

Thus, according to this invention, at least one of the polyolefin foam sheet and the thermoplastic resin sheet is coated with a coating layer of a hot-melting type bonding agent containing a cross-linking agent, and the two are then placed together and are heated and pressed against each other, so that there can be obtained a composite sheet having excellent heat resistant bonding characteristics.

In the specific embodiment set forth in the example the polyester bonding agent was a saturated polyester dissolved in an aromatic hydrocarbon solvent and was the ester produced by the reaction of one or more diols and one or more dicarboxylic acids and has a melting point of 70°-100° C. and has an OH valve of 4-8 and an acid value of 1-2. The cross-linking agent was one or more of a series of "Desmodurs" under the trade names of "Desmodur M", "Desmodur RF", "Desmodur R", "Desmodur TT". The cross-linking type hot-melting bonding agent was prepared by mixing 100 parts, by weight, of the above polyester bonding agent and 5—15 parts, by weight, of the above cross-linking agent.

Numerous modifications and variations of the bonding agent will be evident to those skilled in the art particularly where the polyester can be other substances while the cross-linking agent can be alternative isocyanates or polyisocyanates. The invention is intended to cover all equivalents and the breadth of the scope and spirit of the invention is defined by the attached claims.

What is claimed is:

1. A process for manufacturing a heat-resistant composite sheet comprising the steps of coating at least one of the facing surfaces to be adhered of a thermoplastic resin sheet and a polyolefin foam sheet with a bonding agent prepared by adding a cross-linking agent to a hot-melting type bonding agent of the polyester type or of the polyurethane type, and placing the two sheets one upon another at the bonding agent coated layer and subjecting the sheets to heat and pressure so that a cross-linking hardening treatment may be carried out.

2. A process as claimed in claim 1, wherein the polyolefin foam sheet and the thermoplastic sheet with the bonding agent are heated before being placed one upon another.

3. A process as claimed in claim 1, wherein the thermoplastic resin sheet is a polyvinyl chloride sheet of comparatively small thickness.

4. A process as claimed in claim 1, wherein the polyolefin foam sheet is a polypropylene foam sheet of comparatively large thickness.

5. A process as claimed in claim 1, wherein the cross-linking agent is an isocyanate.

6. A heat-resistant composite sheet manufactured by the process as claimed in any one of claims 1 to 5.

* * * * *